H. O. HAGUE.
HOG DEHAIRING MACHINE.
APPLICATION FILED NOV. 18, 1921.

1,438,438.

Patented Dec. 12, 1922.

Inventor.
Harold O. Hague.
By: Gabel & Mueller
Atty.

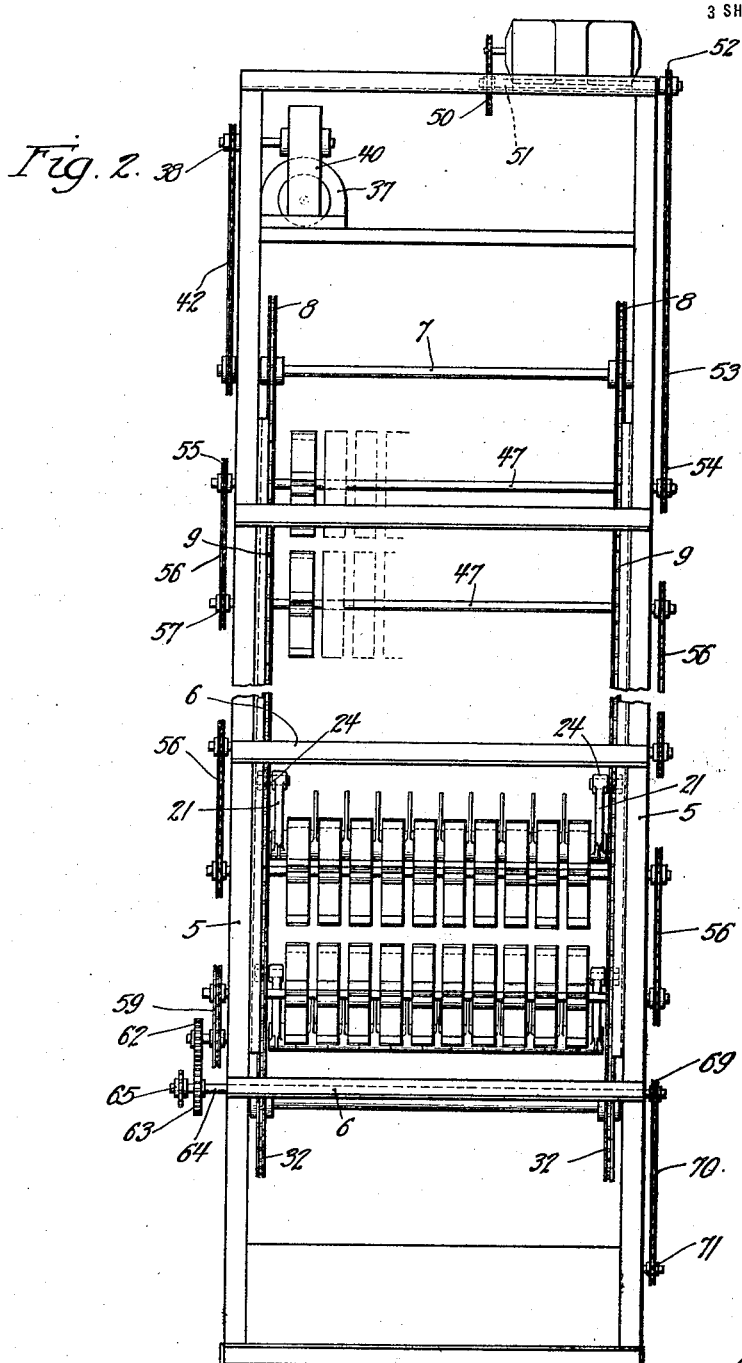

H. O. HAGUE.
HOG DEHAIRING MACHINE.
APPLICATION FILED NOV. 18, 1921.
1,438,438.
Patented Dec. 12, 1922.
3 SHEETS—SHEET 3.
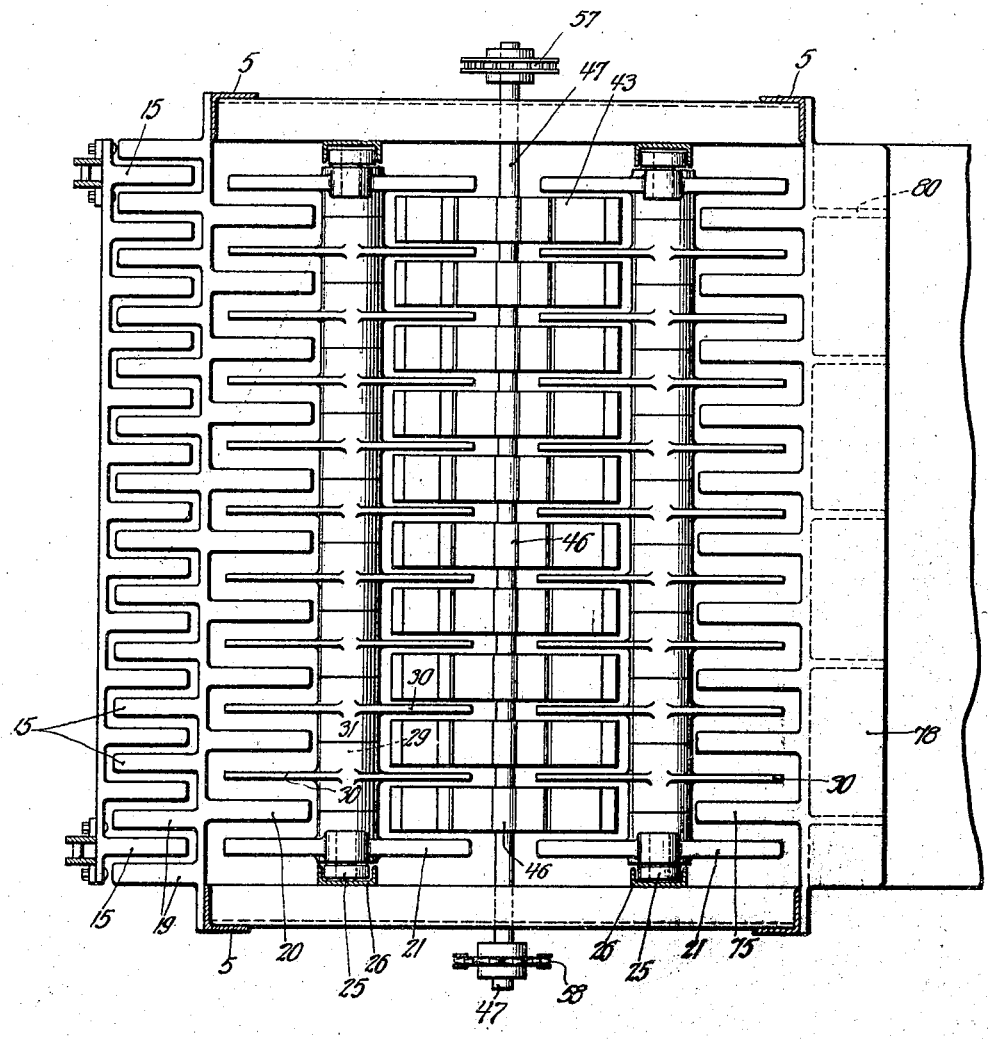
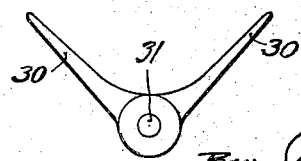

Patented Dec. 12, 1922.

1,438,438

UNITED STATES PATENT OFFICE.

HAROLD O. HAGUE, OF CHICAGO, ILLINOIS, ASSIGNOR TO ROBERT E. JORDAN, OF CHICAGO, ILLINOIS.

HOG-DEHAIRING MACHINE.

Application filed November 18, 1921. Serial No. 516,110.

*To all whom it may concern:*

Be it known that I, HAROLD O. HAGUE, a citizen of the United States, residing at Chicago, in the county of Cook and State of Illinois, have invented a certain new and useful Improvement in Hog-Dehairing Machines, of which the following is a full, clear, concise, and exact description, reference being had to the accompanying drawings, forming a part of this specification.

This invention relates to hog dehairing machines, and more particularly to a machine of this character in which the beaters used for dehairing the hogs act on two carcasses at the same time.

It is a purpose of the invention to provide a hog dehairing machine that is rapid in operation and which thoroughly and efficiently cleans the carcasses passing through the machine.

It is a further purpose of the invention to provide a hog dehairing machine provided with a plurality of rotating beaters for removing the hair, said beaters being so mounted and the carcasses moved through the machine in such a manner that the beaters are not twisted due to movements of the carcasses, the beaters acting on the carcasses with a slapping action.

It is another purpose of the invention to provide a hog dehairing machine that is provided with a plurality of carriers which move along adjacent to the rotating beaters so that the carcasses carried in said carriers will come into cooperating relation with the beaters a plurality of times in their course of travel through the machine.

It is a further object of the invention to provide a dehairing machine of the above mentioned character in which the carriers move in a vertical direction and the beaters are arranged in a plurality of rows, each of said rows being arranged in vertical alignment with the other rows of beaters. The carriers preferably move the carcasses along in a vertical direction at one side of said vertically arranged series of beaters and then back in the opposite direction along the opposite side of said series of beaters. Thus the carcass comes into engagement with each of the beaters a plurality of times in its travel through the machine.

It is another object of the invention to provide a machine for dehairing hogs having a conveyor member that delivers the carcasses to a supporting member from which the carcasses are removed one at a time automatically by the carriers mentioned above, said carriers moving the carcasses first upwardly past the series of beaters or dehairing elements and then downwardly again past the said elements on the opposite side thereof and finally automatically discharging said carcasses upon a table or shelf-like member. The construction of the machine is such that when the machine is once placed in operation, the operation of the machine will be very smooth, there being no sudden strains on the mechanism, as the various parts will be acting with substantially the same load thereon at all times. The conveyor member having the carriers for the carcasses will be carrying substantially the same number of carcasses at all times after the machine is set in operation, and the beaters will be acting on substantially the same number of carcasses at all times, thus eliminating any sudden increases and decreases in load on the apparatus.

The machine is substantially automatic in operation, as all that is necessary is to place the carcasses in position on the conveyor feeding the same to the machine, after which the carcasses are carried through the machine without any further attention thereto being necessary and are deposited on a table after the same are dehaired without the necessity of operating any controlling devices by the operator of the machine.

It is a particular purpose of the invention to provide a stationary basket-like member for receiving the carcasses from the conveyor leading from the scalding tank, said basket being provided with openings through which the row of fingers carrying the carcass on said conveyor are adapted to pass, said basket being also provided with a row of openings on the opposite side thereof, said openings being formed by the projecting tines or prongs through which similar prongs or fingers on the movable carriers are adapted to pass, said carriers being provided with openings therein similar to the openings in the stationary basket and the dehairing elements in the machine being so mounted that the same will strike the carcass through the openings in the movable carriers, said movable carriers being mounted on an endless chain forming an endless conveyor for the carcasses. The carriers also cooperate with a discharging device which comprises a plurality of fingers or tines so arranged that the fingers or tines on the movable carriers pass between said fingers or tines on the discharging device, leaving the carcass behind on the discharging device as the carrier moves downwardly past said fingers. The discharging device is preferably so inclined that the carcasses will travel by gravity down the same onto a table where the carcasses can be operated on in any desired manner, the same having been thoroughly cleaned in the machine before reaching said table. Arranged below the dehairing devices referred to above is a conveyor for carrying away the hair that has been removed from the carcasses.

Other objects and advantages of the invention will appear as the description of the accompanying drawings proceeds. However, I desire to have it distinctly understood that I do not intend to limit myself to the exact details shown or described in the specification, but that I intend to include as part of my invention all such obvious changes and modifications of parts as would occur to a person skilled in this art and as would fall within the scope of the claims.

In the drawings:

Fig. 2 is an end view thereof partly broken away and with certain parts thereof removed to make the interior structure thereof clearer;

Fig. 3 is a section taken on the line 3—3 of Fig. 1; and

Fig. 4 is a side elevation of one of the intermediate members of the carriers.

Figure 1:
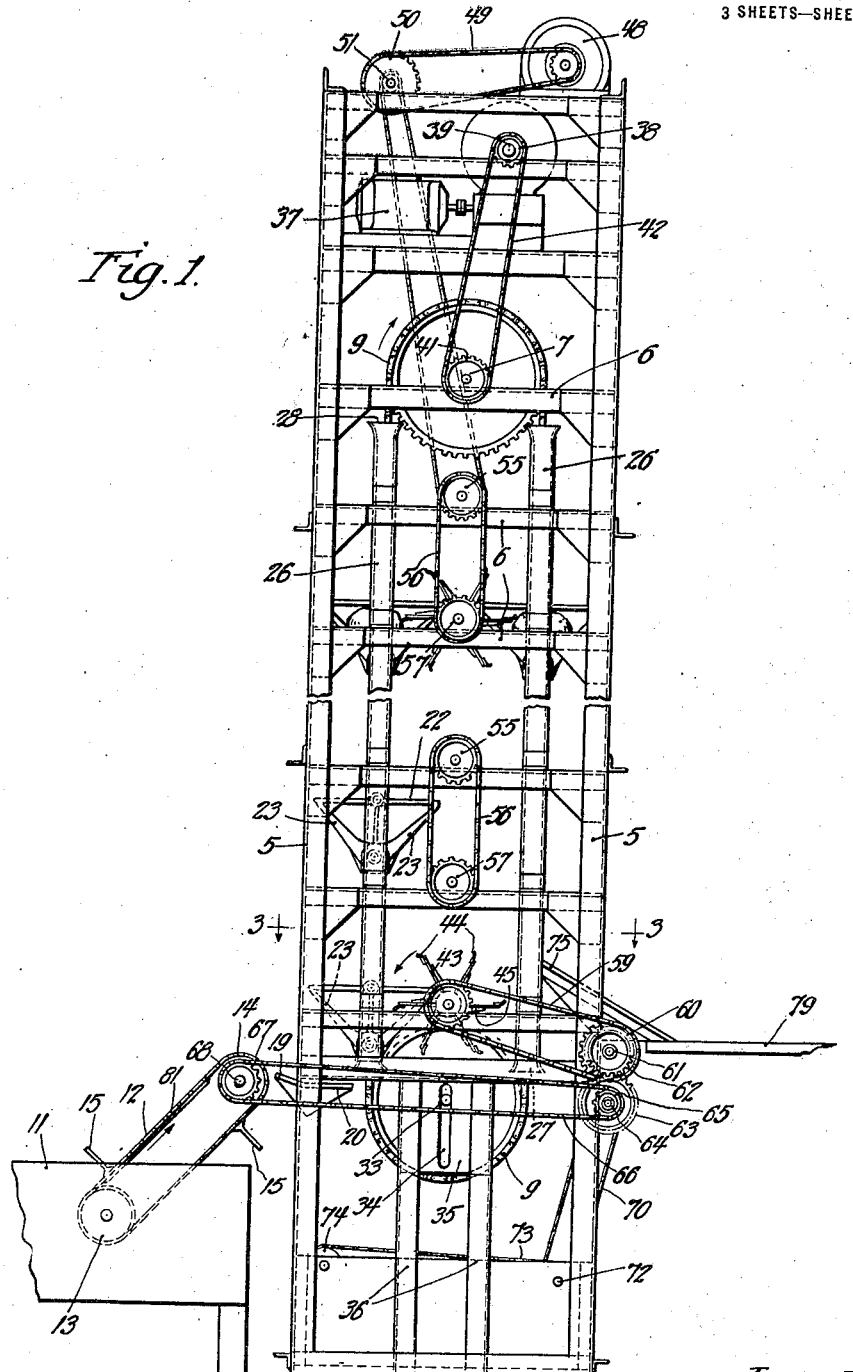
Fig. 1 is a side elevation partly broken away of my improved dehairing machine.

Referring in detail to the drawings, the improved hog dehairing machine comprises a framework having the vertically extending members 5 and the transversely extending members 6. One of said transversely extending members 6 supports one end of a shaft 7, the other end of said shaft being supported by a member 6 in alignment with the member 6 shown in Fig. 1. Mounted on the shaft 7 are the sprockets 8 over which the chains 9 of the conveyor having the carriers 10, operate. Adjacent the dehairing machine is arranged the scalding tank 11. A conveyor having side chains 12 which operate over the sprockets 13 and 14 is provided for carrying the carcasses from the scalding tank 11 to the dehairing machine. The conveyor is provided with flights 16 each having a row of fingers 15 projecting outwardly from the same and carrying the carcasses from the scalding tank to the dehairing machine along the inclined plate 81. The fingers or teeth 15 are spaced, as will be clear from Fig. 3, and are arranged in a row transversely of the flight, said teeth or fingers being provided on the plate 16 which is secured to the conveyor chains 12 in any desired manner by means of the bolts 17. Mounted between two of the vertically extending members 5 on the framework is the carcass receiving member 18, said member 18 being fixed on the framework and being provided with a row of fingers or teeth 19 which intermesh with the teeth 15 on the conveyor belt, as will be clear from Fig. 3. As the teeth 15 are staggered in relation to the teeth 19, they will pass the same as the conveyor moves in the direction of the arrow in Fig. 1.

It will be seen that the teeth or fingers 19 are inclined downwardly toward the center of the carcass receiving member 18, and that the teeth or fingers 20 are standing in a direction opposite to the fingers 19 which extend substantially horizontally, and are located below the uppermost point of the fingers 19. Accordingly the carcass will after having passed the uppermost point of the conveyor 12 drop onto the member 18 and fall on the substantially horizontally extending fingers 20 and will lie in this position until removed from the supporting member 18 by the carriers 10, as will be explained. The carriers 10 each comprise a pair of end members 21 which have a transversely extending portion 22 connecting the diagonally extending members 23, said members 21 being pivotally carried by the chain 9 at 24. The members 23 converge toward the lower end portion of the members 21 and are provided at their point of convergence with guide rollers 25 which operate in the channeled guideways 26 secured to the framework in any desired manner. The guide members 26 are provided with flared end portions at 27 and 28, as will be clear from Fig. 1 of the drawings.

The members 21 are connected by means of a shaft 29 upon which is mounted between the members 21 a plurality of members having diverging arms 30 extending parallel to the arms 23, said arms 30 diverging from the hub 31 through which the shaft 29 passes. The arms or fingers 30, it will be seen from Fig. 3, pass between the arms or fingers 20 and as the members 10 pass upwardly the conveyor operating in the direction indicated by the arrow in Fig. 1, the carcass will be picked up by the arms 30 and will be carried upwardly with the carriers 10. The operation of the conveyor 12 and of the conveyor having the side chains 9 being so timed that a carcass will always be placed in position on the member 18 as rapidly as the carcasses are removed by the carriers 10. The side chains 9 of the conveyor operate over the sprockets 8 and the sprockets 32, the sprockets 32 being mounted on the shaft 33 which is adjustable in the slot 34 in the member 35, which is mounted between the vertically extending members 36 of the framework. It will thus be seen that the tension on the side chains 9 can be adjusted to any desired tension by movement of the shaft 33 in the slots 34. The conveyor is driven from the motor 37 which drives the sprocket 38 provided on the shaft 39 through the worm gearing at 40, the sprocket 38 driving the sprocket 41 on the shaft 7 through the chain 42 extending over the sprockets 38 and 41.

Mounted between the two vertically extending portions of the conveyor having the carriers 10 are the dehairing elements which are arranged in transversely extending rows, there being a series of said rows extending vertically between the vertically extending portions of the conveyor. The dehairing elements comprise the radially extending flexible beaters 43 having the metallic scrapers 44 on the ends thereof, said members 43 being mounted on radially extending arms 45 extending outwardly from the hub 46 of each of said members, said members being keyed on a shaft 47 which is rotated by the driving mechanism which will be now described. A motor 48 drives the sprocket 50 through the chain 49, the sprocket 50 being carried on the shaft 51 and carrying a sprocket 52 at the opposite end thereof from the sprocket 50 over which a chain 53 operates, which also passes over the sprocket 54 on the uppermost shaft 47. The opposite end of this shaft 47 is provided with a sprocket 55 over which the chain 56 operates, which also passes over the sprocket 57 on the next lower shaft 47. In a similar manner the other shafts and the beaters carried by the same are operated by similar sprocket chains 56 operating over similar sprockets 55 and 57, as will be clear from Figs. 1 and 2. The lowermost shaft 47 is provided with a sprocket 58 at one end thereof over which passes the sprocket chain 59, which also passes over the sprocket 60 mounted on the shaft 61, said shaft 61 also having the gear 62 keyed thereto which meshes with the gear 63 carried on the shaft 64, said shaft 64 having the sprocket 65 also keyed thereon, and a chain 66 being provided that passes over the sprocket 65 and over the sprocket 67 keyed on the shaft 68, said shaft 68 also carrying the sprockets 14 for the conveyor.

The shaft 64 is also provided with a sprocket 69 on the end thereof opposite the sprocket 65 over which a chain 70 operates, which passes over the sprocket 71 keyed on the shaft 72, which shaft 72 is provided with suitable driving sprockets for the hair conveyor 73 which also operates over the sprocket 74 on the opposite side of the framework from the shaft 72.

It will be seen that all of the beaters or dehairing elements rotate in the same direction, and that as the carriers 10 move upwardly the dehairing elements will strike the carcass and will tend to rotate the same in a clockwise direction as viewed in Fig. 1, thus rotating the carcass and striking the same through the openings between the fingers 30 so as to remove the hair from all parts thereof, the carriers providing a rigid support for the carcass and yet permitting the beaters to engage the same and permitting rotation of the carcass without causing twisting of the beater elements. After the carriers 10 have traveled upwardly to the uppermost portion of the conveyor and have started their downward movement, the dehairing elements will strike the carcass again through the openings in the carriers, as in the case when the carrier members are moving upwardly, but will strike upwardly against the carcass instead of downwardly as was previously the case and causing a rotation of the carcass in the opposite direction, thus completing the cleaning of the carcass in a thorough manner.

It will be seen that each carcass comes into cooperating relation with each of the rows of dehairing elements a plurality of times due to the fact that it moves upwardly along one side of the dehairing elements first, and then downwardly along the opposite side thereof, thus obtaining double the use of the dehairing elements for every rotation thereof over what is commonly the case. As the carriers travel downwardly, the fingers 30 thereon pass between the fingers 75 on the discharge member 76, said discharge member being provided with strengthening ribs 77 as clearly shown in Fig. 1.

It will be seen that as the members 30 pass through between the fingers 75, as will be clear from Fig. 3, that the carcass will be left behind on the fingers 75. As the fingers 75 are inclined, the carcass will slide or roll down the same onto the guideway 78 and onto the table 79. The guideway 78 is also provided with strengthening ribs 80 as will be clear from Fig. 3.

It will be noted that the discharge device is also fixed in a stationary position on the frame in the same manner as the receiving pocket 18, thus reducing the number of movable parts and making it unnecessary for an operator to actuate any mechanism in order to discharge the carcass from the machine, or in order to feed a carcass to the machine.

Having thus described my invention, what I desire to claim and secure by U. S. Letters Patent is:

1. A device of the character described comprising dehairing elements, and a conveyor for carrying a plurality of carcasses into position to be acted on by said dehairing elements, each of said dehairing elements simultaneously acting on a plurality of carcasses on said conveyor.

2. A device of the character described comprising rotating dehairing elements, and a continuous conveyor for carrying a plurality of carcasses along opposite sides of said dehairing elements, whereby each of said dehairing elements acts simultaneously on a plurality of carcasses on said conveyor.

3. A device of the character described comprising rotating dehairing elements, and a conveyor for carrying a plurality of carcasses along opposite sides of said dehairing elements, said conveyor and said dehairing elements occupying such relative positions that diametrically opposed portions of said dehairing elements are simultaneously acting on different carcasses.

4. A device of the character described comprising a plurality of rotating dehairing elements, and a continuous conveyor member for the carcasses that are to be cleaned having portions passing on both sides of said dehairing elements whereby each of said elements simultaneously engages with a plurality of carcasses to clean the same.

5. A machine of the character described comprising a plurality of rows of dehairing elements, and a conveyor for moving the carcasses into engagement with each of said rows of dehairing elements a plurality of times.

6. A machine of the character described comprising a plurality of rows of dehairing elements, and a conveyor for moving the carcasses into engagement with each of said rows of dehairing elements a plurality of times, each of said rows of elements acting on a plurality of carcasses simultaneously.

7. In a machine of the character described, a plurality of dehairing elements, said dehairing elements being arranged in vertical alignment and a single carcass conveyor having vertically extending portions extending on opposite sides of said dehairing elements, whereby said elements act on a plurality of carcasses simultaneously.

8. In a machine of the character described, a plurality of dehairing elements, said dehairing elements being aligned, and a single carcass conveyor having a plurality of portions extending parallel to said elements on opposite sides thereof, whereby said elements act on a plurality of carcasses simultaneously.

9. In a machine of the character described, a carcass supporting member, a plurality of individual carcass carriers each adapted to receive and support a carcass from said carcass supporting member, a plurality of dehairing elements adapted to operate on said carcasses while in position on said carriers, and means for removing said carcasses from said carriers after said carcasses have been dehaired.

10. In a machine of the character described, a stationary carcass supporting member, a plurality of carcass carriers each adapted to receive and support a carcass from said carcass supporting member, a plurality of dehairing elements adapted to operate on said carcasses while in position on said carriers, and means for removing said carcasses from said carriers after said carcasses have been dehaired.

11. In a machine of the character described, a stationary carcass supporting member, a plurality of carcass carriers each adapted to receive a carcass from said carcass supporting member, a plurality of dehairing elements adapted to operate on said carcasses while in position on said carriers, and stationary means for removing said carcasses from said carriers after said carcasses have been dehaired.

12. In a machine of the character described, a stationary carcass supporting member, means for placing carcasses one at a time on said supporting member, a plurality of individual carcass carriers each adapted to receive a carcass from said supporting member, a plurality of dehairing elements adapted to operate on said carcasses while in position on said carriers, and a stationary member for removing said carcasses from said carriers and discharging the same from said machine after said carcasses have been dehaired.

13. In a machine of the character described, a carcass supporting member, a conveyor comprising a plurality of carcass carriers each adapted to receive a carcass from said carcass supporting member, a plurality of dehairing elements adapted to operate on said carcasses while in position on said carriers and means for removing said carcasses from said conveyors after said carcasses have been dehaired, said carriers moving said carcasses into cooperating relation with said dehairing elements at both sides thereof.

14. In a machine of the character described, a stationary carcass supporting member, a plurality of individual carcass carriers each adapted to receive a carcass from said carcass supporting member, a plurality of dehairing elements adapted to operate on said carcasses while in position on said carriers and means for removing said carcasses from said carriers after said carcasses have been dehaired, said dehairing elements being located with respect to said carriers so as to act on a plurality of carcasses simultaneously.

15. In a machine of the character described, a carcass supporting member, a plurality of carcass carriers each adapted to receive a carcass from said carcass supporting member, a plurality of dehairing elements adapted to operate on said carcasses while in position on said carriers and means for moving each of said carriers a plurality of times into such position that each of said dehairing elements will engage said carcass a plurality of times.

16. In a machine of the character described, a carcass supporting member, a conveyor comprising a plurality of carcass carriers each adapted to receive a carcass from said carcass supporting member, a plurality of dehairing elements adapted to operate on said carcasses while in position on said carriers, and means for actuating said conveyor to move each of said carriers along opposite sides of said dehairing elements whereby said elements simultaneously engage a plurality of said carcasses.

17. In a machine of the character described, a stationary carcass supporting member, a plurality of carcass carriers each adapted to receive a carcass from said carcass supporting member, a plurality of dehairing elements adapted to operate on said carcasses while in position on said carriers, said dehairing elements rotating said carcasses on said carriers, and means for removing said carcasses from said carriers after said carcasses have been dehaired.

18. In a machine of the character described, a plurality of carcass carriers each adapted to receive a carcass thereon, means for rotating and dehairing said carcasses while in position on said carriers, and means for moving said carriers into such positions relative to said dehairing means as to rotate said carcasses first in one direction and then in the opposite direction.

19. In a machine of the character described, a plurality of carcass carriers each adapted to receive a carcass thereon, means for rotating and dehairing said carcasses while in position on said carriers, and means for moving said carriers into such positions relative to said dehairing means as to rotate said carcasses first in one direction and then in the opposite direction, each of said dehairing means acting on a plurality of carcasses simultaneously.

20. In a machine of the character described, an endless conveyor having a plurality of carcass carriers, said conveyor having parallel portions, and dehairing means between the parallel portions of said conveyor, said dehairing means being adapted to act simultaneously on a plurality of carcasses.

21. In a machine of the character described, an endless conveyor having a plurality of carcass carriers, said conveyor having parallel portions moving in opposite directions, and dehairing means between the parallel portions of said conveyor, said dehairing means being adapted to act simultaneously on a plurality of carcasses.

22. In a machine of the character described, an endless conveyor having a plurality of individual carcass carrying holders, said holders having openings therein, and dehairing elements having beaters adapted to pass through said openings to clean the carcasses on said carriers.

23. In a machine of the character described, an endless conveyor having a plurality of individual carcass carriers, said carriers having openings therein, and dehairing elements having beaters aligned with said openings and adapted to pass therethrough to clean the carcasses on said carriers.

24. In a machine of the character described, an endless conveyor having a plurality of carcass carriers, said conveyor having parallel portions, and dehairing means between the parallel portions of said conveyor, said dehairing means being adapted to act simultaneously on a plurality of carcasses, said carriers being provided with means for guiding the movement thereof.

25. In a machine of the character described, an endless conveyor having a plurality of carcass carriers, said conveyor having parallel portions, and dehairing means between the parallel portions of said conveyor, said dehairing means being adapted to act simultaneously on a plurality of carcasses, said carriers being provided with means for guiding the movement thereof, said means comprising guide rollers on said carriers and channels on the framework of said machine in which said rollers operate.

26. In a machine of the character described, an endless conveyor having a plurality of individual carcass carriers, said carriers having openings therein, and dehairing elements having beaters aligned with said openings and adapted to pass therethrough to clean the carcasses on said carriers, each of said beaters simultaneously acting on a plurality of said carcasses.

27. In a machine of the character described, a carcass receiving support comprising a plurality of spaced supporting members, and means for carrying carcasses to said support comprising a conveyor having spaced fingers engaging the carcasses to move the same toward said support, said fingers being mounted to pass through the spaces between said supporting members.

28. In a machine of the character described, a carcass support comprising a plurality of spaced supporting members and carcass carriers having spaced supporting members arranged to pass between the supporting members of said carcass support.

29. In a machine of the character described, a carcass support comprising a plurality of spaced supporting members, means for moving carcasses onto said support, and carcass carriers having spaced supporting fingers adapted to pass upwardly between said supporting members to transfer carcasses from said support to said carriers.

30. In a machine of the character described, a carcass support comprising a plurality of spaced supporting members, means for moving carcasses onto said support, carcass carriers having spaced supporting fingers adapted to pass upwardly between said supporting members to tranfer carcasses from said support to said carriers, and dehairing elements adapted to engage said carcasses through said spaces while in position on said carriers.

31. In a machine of the character described, a carcass support comprising a plurality of spaced supporting members, means for moving carcasses onto said support, carcass carriers having spaced supporting fingers adapted to pass upwardly between said supporting members to transfer carcasses from said support to said carriers, and rotating dehairing elements adapted to engage said carcasses through said spaces while in position on said carriers, said dehairing elements acting on a plurality of carcasses simultaneously.

32. In a machine of the character described, carcass carriers having spaced supporting fingers, dehairing elements acting on said carcasses while in position on said carriers, and means for discharging said carcasses from said machine comprising spaced inclined fingers so arranged that the fingers on said carriers will pass between said inclined fingers.

33. In a machine of the character described, carcass carriers having spaced supporting fingers, said carriers moving first upwardly and then downwardly through said machine, dehairing elements acting on said carcasses while in position on said carriers, and means for discharging said carcasses from said machine comprising spaced inclined fingers so arranged that the fingers on said carriers will pass between said inclined fingers as said carriers move downwardly, leaving said carcasses on the inclined surface of said discharging means, from which said carcasses pass from said machine by gravity.

34. In a machine of the character described, a vertically arranged series of dehairing elements, said series comprising coaxially arranged groups of dehairing elements, a carcass conveyor comprising carcass carriers moving vertically through said machine on both sides of said series of dehairing elements, said carriers having openings through which said dehairing elements are adapted to engage said carcasses, and means for feeding carcasses to said carriers.

35. In a machine of the character described, a vertically arranged series of dehairing elements, said series comprising coaxially arranged groups of dehairing elements, a carcass conveyor comprising carcass carriers moving vertically through said machine on both sides of said series of dehairing elements, said carriers having openings through which said dehairing elements are adapted to engage said carcasses, and means for discharging carcasses from said carriers.

36. In a machine of the character described, a vertically arranged series of dehairing elements, said series comprising coaxially arranged groups of dehairing elements, and a carcass conveyor comprising carcass carriers moving vertically through said machine first upwardly on one side of said dehairing elements and then downwardly on the other side thereof, whereby each of said dehairing elements acts simultaneously on a plurality of said carcasses and each of said carcasses is acted on a plurality of times by each of said dehairing elements.

37. In a machine of the character described, movable individual carcass carrying and supporting members having openings therein and rotating dehairing elements engaging the carcasses on said carriers, said dehairing elements having flexible beaters, the movement of said carrying members being parallel to that of said dehairing elements, whereby twisting of said beaters is prevented.

38. In a machine of the character described, a plurality of rotating beaters, and a plurality of carriers mounted to move in a path adjacent said beaters so that the carcasses on said carriers move into cooperating relation with said beaters a plurality of times in their course of travel through the machine.

In witness whereof, I hereunto subscribe my name this 28th day of October, A. D. 1921.

HAROLD O. HAGUE.